(12) United States Patent
Johnson

(10) Patent No.: US 8,944,094 B2
(45) Date of Patent: Feb. 3, 2015

(54) ADAPTOR FOR USE WITH A VALVE FITMENT FOR DISPENSING FLUIDS

(71) Applicant: Liqui-Box Corporation, Worthington, OH (US)

(72) Inventor: James W. Johnson, Delaware, OH (US)

(73) Assignee: Liqui-Box Corporation, Worthington, OH (US)

( * ) Notice: Subject to any disclaimer, the term of this patent is extended or adjusted under 35 U.S.C. 154(b) by 28 days.

(21) Appl. No.: 13/804,555

(22) Filed: Mar. 14, 2013

(65) Prior Publication Data
US 2013/0277966 A1  Oct. 24, 2013

Related U.S. Application Data

(60) Provisional application No. 61/610,723, filed on Mar. 14, 2012.

(51) Int. Cl.
*F16L 37/084* (2006.01)
*B67D 7/06* (2010.01)
*B67D 1/14* (2006.01)
*B67D 3/04* (2006.01)

(52) U.S. Cl.
CPC .............. *F16L 37/084* (2013.01); *B67D 3/04* (2013.01)
USPC .......... 137/382; 137/377; 137/380; 222/185.1

(58) Field of Classification Search
USPC ........ 137/377, 379, 380, 382, 801; 222/185.1
See application file for complete search history.

(56) References Cited

U.S. PATENT DOCUMENTS

| | | | | |
|---|---|---|---|---|
| 4,135,540 | A * | 1/1979 | Felsen | 137/78.5 |
| 6,126,046 | A * | 10/2000 | Baculy | 222/505 |
| 6,247,620 | B1 * | 6/2001 | Makainai | 222/185.1 |
| 2012/0247513 | A1 * | 10/2012 | Johnson | 134/22.11 |

* cited by examiner

*Primary Examiner* — John Rivell
*Assistant Examiner* — Kevin Barss
(74) *Attorney, Agent, or Firm* — Baker & Hostetler LLP

(57) ABSTRACT

This invention relates to an adaptor that is used with a valve fitment assembly used to dispense fluids or flowable materials from a container. The adaptor is utilized in conjunction with the valve fitment assembly to allow the fitment assembly to be used with a spout and valve assembly attached to a container holding fluid. This invention also relates to a process for dispensing fluid using the adapter described herein.

1 Claim, 7 Drawing Sheets

ADAPTOR FOR USE WITH A VALVE FITMENT FOR DISPENSING FLUIDS

FIELD OF INVENTION

This invention relates to an adaptor that is used with a valve fitment assembly used to dispense fluids or flowable materials from a container. The adaptor is utilized in conjunction with the valve fitment assembly to allow the fitment assembly to be used with a spout and valve assembly attached to a container holding fluid.

BACKGROUND

For example, a valve fitment assembly may be used to dispense liquid from a collapsible bag or container. However, this fitment assembly can only be used in conjunction with a certain design of spout and valve assembly that is attached to the container. Containers having a different spout and valve assembly design cannot be used with this valve fitment assembly.

The adaptor of this invention allows for the use of such a valve fitment to be used with other spout and valve assemblies attached to a fluid container.

SUMMARY OF INVENTION

This invention relates to an optionally L-shaped adaptor used in a fitment valve assemble comprising:

(I) a vertical cylindrical housing, and
(II) a horizontal cylindrical channel;

wherein said vertical cylindrical housing and said horizontal cylindrical channel are connected to each other in an L-shape;

wherein said vertical cylindrical housing comprises a front wall, and is partially open at the back wall, wherein said opening is the locus for connecting a spout-valve assembly attached to a container that dispenses fluid;

wherein, optionally, said front wall, on the inside, comprises a locking groove for locking said adaptor to said spout-valve assembly;

wherein, optionally, said vertical cylindrical housing comprises two optionally J-shaped pull-tabs attached to the two sides of said front wall, such that said vertical cylindrical housing's side walls protrude over the base of said J-shaped pull-tabs;

wherein, optionally, attached to the opening at the back wall of said vertical cylindrical housing is an optionally U-shaped tray that supports said spout-valve assembly attached to the fluid dispensing container;

wherein said horizontal cylindrical channel comprises at least a first opening and a second opening;

wherein said first opening is at the first end proximate to the joint of said optionally L-shaped adaptor, and at the top of said horizontal cylindrical channel such that said first opening opens at the bottom of said vertical cylindrical housing;

wherein said second opening, used for dispensing fluid into a fluid dispensing setup, is at the opposite end to said first end of said horizontal cylindrical channel;

wherein at the base of the horizontal cylindrical channel directly below said first opening in said horizontal cylindrical channel is an optionally cylindrical activator pin;

wherein, optionally, said activator pin is supported by at least one ridge, that is optionally triangular;

wherein at the top of said first opening proximate to the bottom of said vertical cylindrical housing is optionally an O-ring for sealing attachment with said spout-valve assembly;

wherein said O-ring is situated in optionally a second vertical cylindrical channel that is narrower that said vertical cylindrical housing; wherein, optionally, on the outside wall of said horizontal cylindrical channel, oriented generally transversely to the longitudinal axis of said second horizontal cylindrical channel and protruding outward, are locking tabs, one on each side of said horizontal cylindrical channel, that are used for locking the locking mechanism of said fluid dispensing setup with said adaptor;

wherein optionally, said horizontal cylindrical channel further comprises a third opening at its second end that is in optionally in a radial plane to the longitudinal axis of said horizontal channel;

wherein optionally said third opening is closed with a cap.

DETAILED DESCRIPTION OF THE INVENTION

Ranges are used herein in shorthand, so as to avoid having to list and describe each and every value within the range. Any appropriate value within the range can be selected as the upper value, lower value, or the terminus of the range.

As used herein, the singular form of a word includes the plural, and vice versa, unless the context clearly dictates otherwise. Thus, the references "a", "an", and "the" are generally inclusive of the plurals of the respective terms. For example, reference to "a method" includes a plurality of such "methods". Likewise the terms "include", "including" and "or" should all be construed to be inclusive, unless such a construction is clearly prohibited from the context. Similarly, the term "examples," particularly when followed by a listing of terms, is merely exemplary and illustrative and should not be deemed to he exclusive or comprehensive.

The term "comprising" is intended to include embodiments encompassed by the terms "consisting essentially of" and "consisting of". Similarly, the term "consisting essentially of" is intended to include embodiments encompassed by the term "consisting of".

The methods and compositions and other advances disclosed herein are not limited to particular equipment or processes described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

Figure 1:
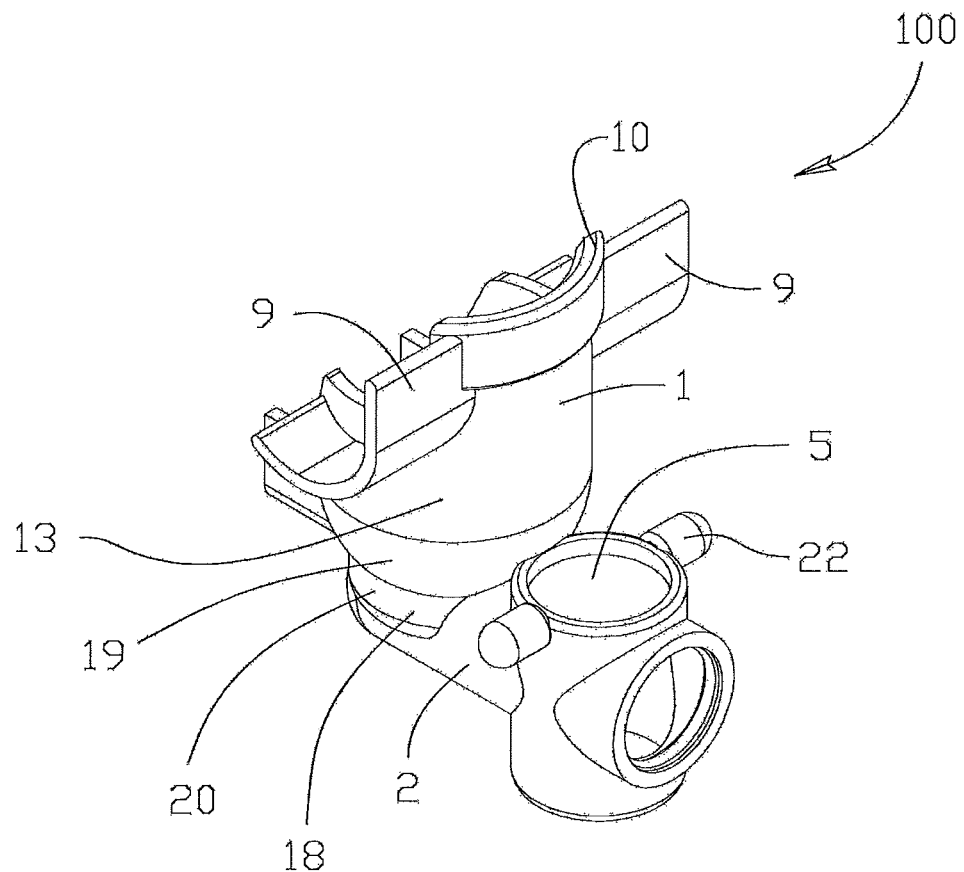
FIG. 1 is a perspective view of the adaptor from the front and side.
Figure 2:
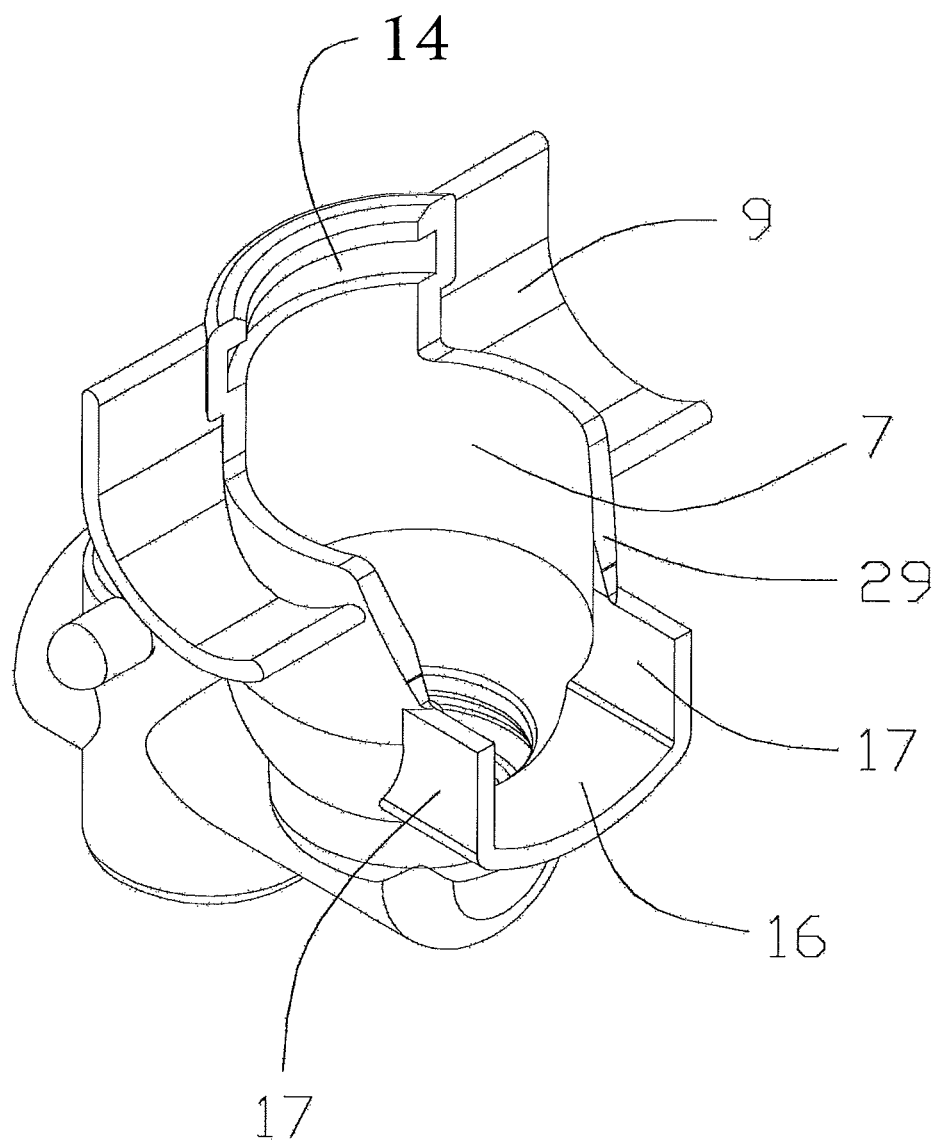
FIG. 2 is the perspective view of the adaptor from the back and side.
Figure 3:
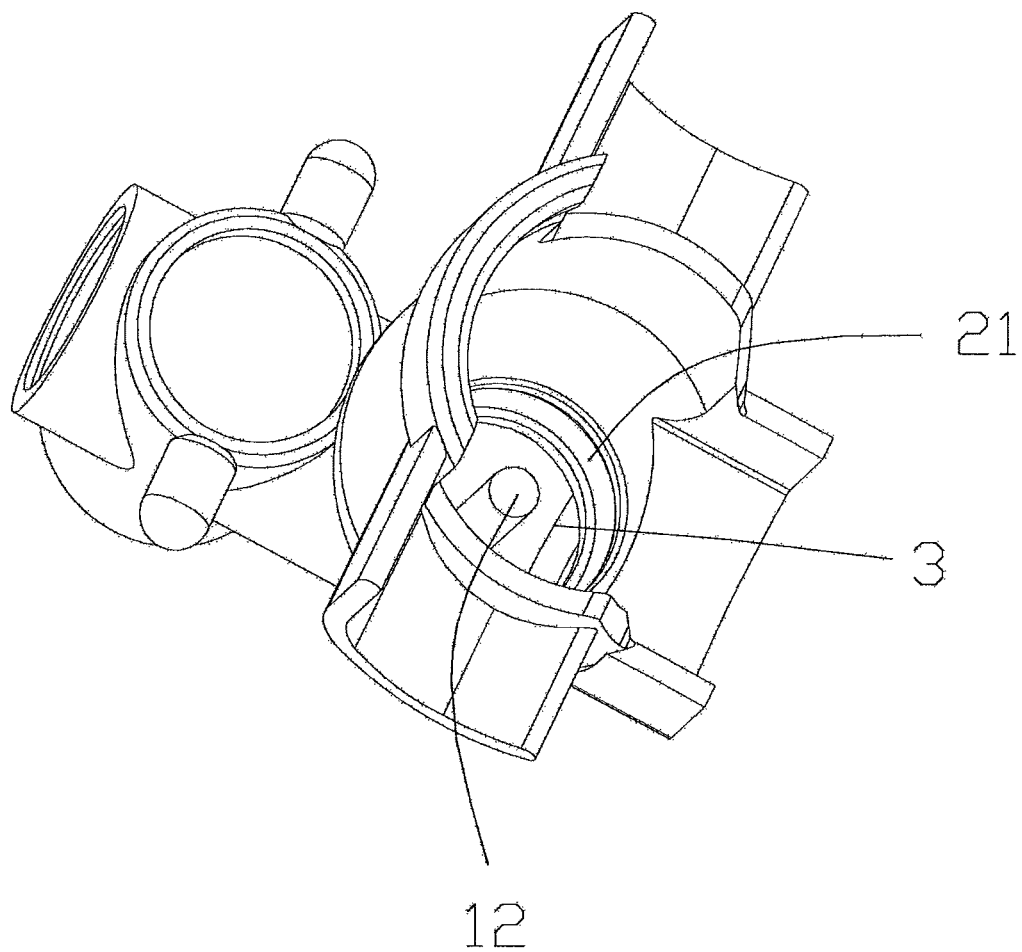
FIG. 3 is the perspective view of the adaptor from the top.
Figure 5:
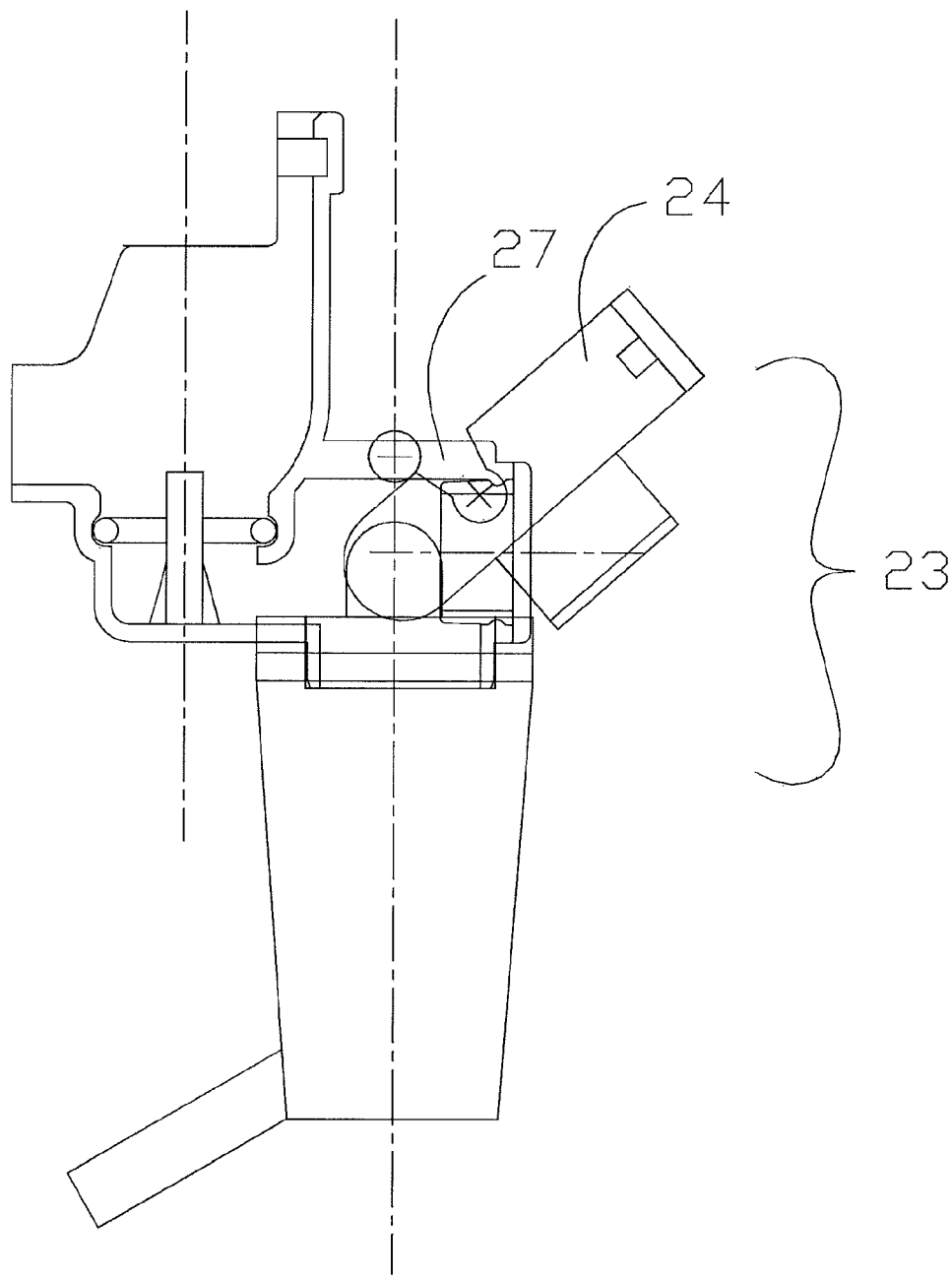
FIG. 5 is a line diagram of the adaptor attached to the dispensing setup but without the locking mechanism in locked position.
Figure 7:
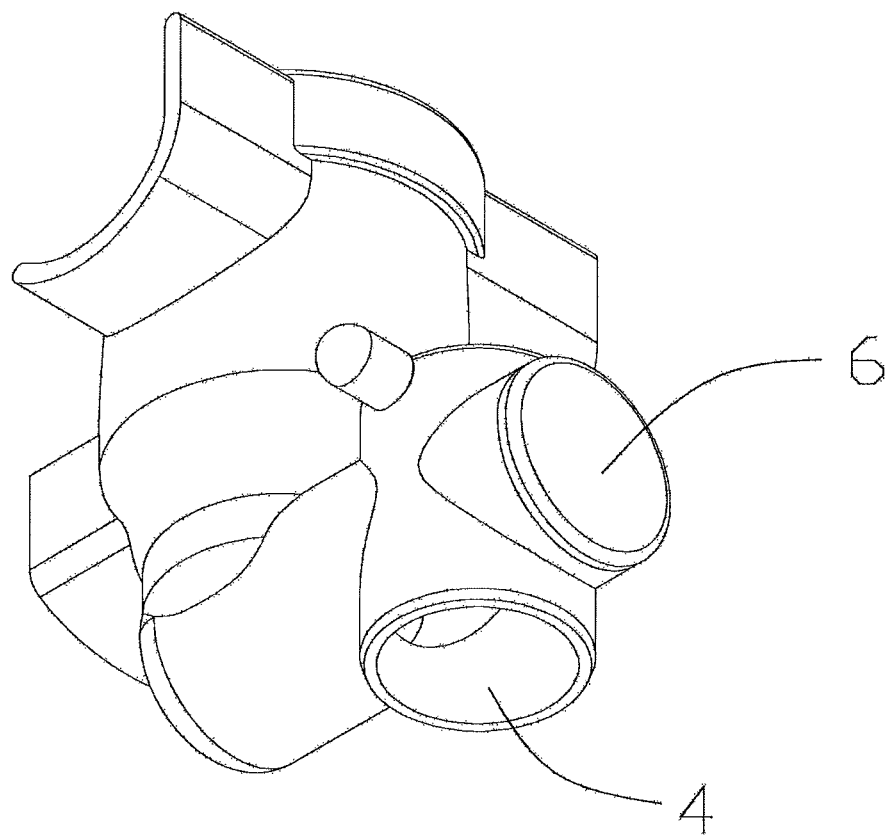
FIG. 7 is the perspective view from the bottom.

As used herein, the term "flowable material" does not include gaseous materials, but encompasses materials which are flowable under gravity or may be pumped. Such materials include liquids, for example, milk, water, fruit juice, oil; emulsions, for example, ice cream mix, soft margarine; pastes, for example, meat pastes, peanut butter; preserves, for example, jams, pie fillings, marmalade; jellies; doughs; ground meat, for example, sausage meat; powders, for example, gelatin powders, detergents; granular solids, for example, nuts, sugar; and like materials. The invention described herein is particularly useful for flowable foods such as milk, A perspective view from the top, a perspective view from the front and a perspective view from the back are shown for the adaptor of the present invention in FIGS. 1, 2, and 3, respectively. The adaptor (100) comprises of a vertical housing (1), preferably cylindrical, and a horizontal channel (2), also preferably cylindrical, generally forming an L-shape. The vertical housing (1), which forms the vertical leg of the L-shape is partially open to the outside (7), while the horizontal channel (2) is closed, with at least two openings, first opening (3) connecting to the vertical housing (1) and the second opening (4) at the opposite end, which connects to a dispensing setup (see below and FIG. 5), and, optionally, a third opening (5), which, if present, can be closed off with a cap (6) (see FIG. 7).

In one embodiment, the L-shaped adaptor (100) is a single piece of plastic. The vertical housing is generally cylindrical (1), with an opening on its back side (7), that is, the vertical cylindrical housing (1) is only partially complete. As a matter of fact, in one embodiment, the back side (7) of the vertical housing (1) is open such that only about two-thirds of the cylinder is closed, and which displays a cut-away section.

Figure 4:
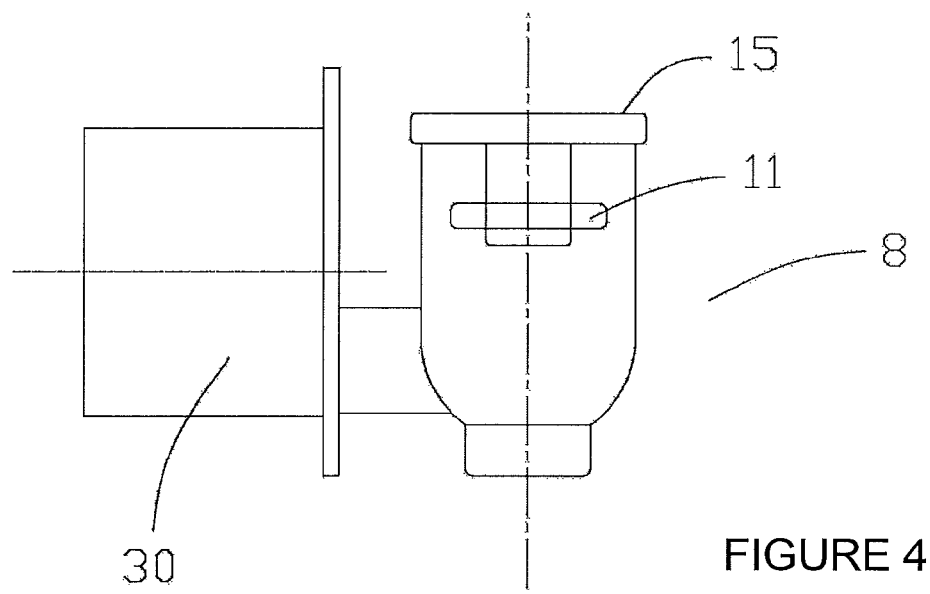
FIG. 4 is a line diagram of the side view of the spout and valve assembly of the adaptor connected to a fluid container.
Figure 4A:
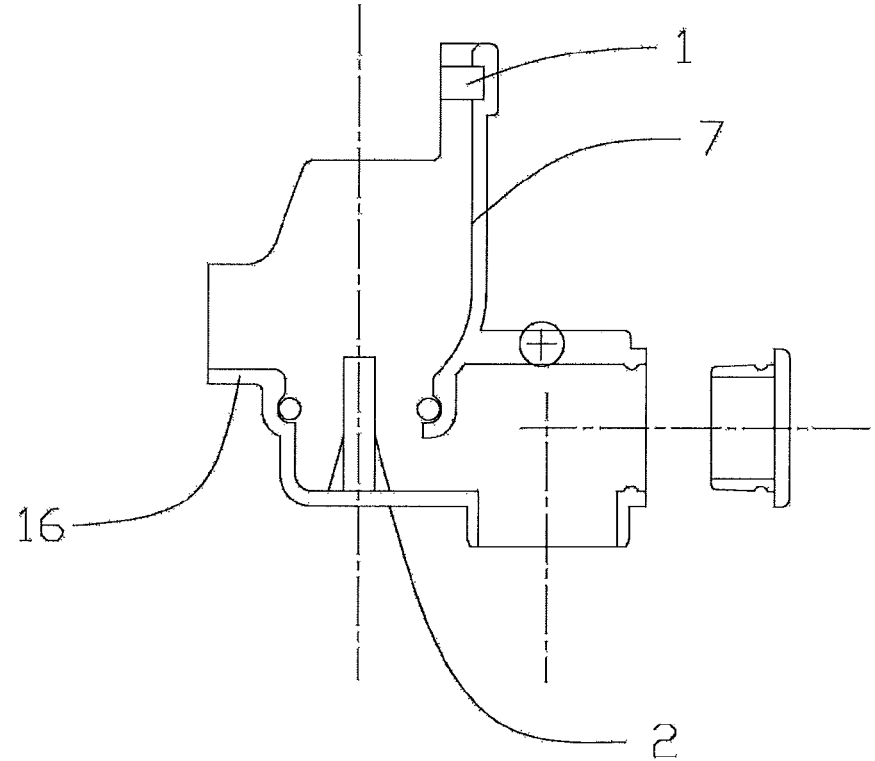
FIG. 4A is a line diagram of the side view of the adaptor, cap, and the spout-valve assembly.

The open portion (7) of the vertical cylindrical housing (1) on it back side is used to connect the L-shaped adaptor (100) to a spout-and-valve assembly attached to a fluid container (30) (see FIG. 4 & FIG. 4A). Attached to the near top of the vertical cylindrical housing (1) on either side of the open cylinder (18), on the outside of the cylinder (18), are two, optionally-J-shaped, pull tabs (9), that are used to detach the adaptor (100) from the spout-and-valve assembly (8) attached to the fluid container. The partial cylindrical portion (10) that extends above the J-shaped pull tabs (9) are designed dimensionally such that attachment of the adaptor (100) to the spout-and valve assembly (8) of the fluid container helps activate the spout and valve to open the fluid container and initiating the flow of fluid out of the container.

When the adaptor (100) is attached to the spout-and-valve assembly, the partial vertical cylindrical housing (10) extending beyond the J-shaped pull tabs (9) activates at least one, and preferably two optionally horizontal wings (11) attached to the spout-and-valve assembly (8), by moving them vertically upward. This vertically upward movement opens the valve within the spout-and-valve assembly (8) thereby rendering the flow movement out to the horizontal cylindrical channel. The activation is also aided by the seal activator pin (12) described below. The vertical cylindrical housing wall (13) proximate to the horizontal channel (2) of the L-shaped adaptor (100) extends as high as the top portion of the J-shaped pull tabs (9), and in some instances, even higher. In the extended portion of the cylindrical wall, at the top, on the inside, and in between the J-shaped pull tabs (9) is a locking groove (14) or an indentation channel that goes within the depth of the vertical cylindrical housing's (1) extended portion, The locking groove (14) locks the adaptor (100) to the top ridge (15) of the spout-and-valve assembly (8) attached to the fluid container. When the adaptor (100) is locked with the spout-and-valve assembly (8), the spout-and-valve assembly (8) fit snugly within the partially open vertical cylindrical housing (1). A bottom tray (16) attached to the bottom portion of the open vertical cylindrical housing (1) helps in snugly fitting the spout-and-valve assembly (8) to the adaptor (100). The preferably U-shaped bottom tray (16) with two vertical walls (17) is attached (in the embodiment that is a monolithic adaptor) to the partial cylindrical wall (29) of the vertical housing (1) and forms the protrusion beyond the partial cylindrical wall (29) and appears in a U-shape when viewed in the back view of the adaptor (100).

The vertical cylindrical housing (1), in a preferred embodiment, can taper (19) into a second cylindrical section (18) located at the joint (20) of the two legs of the L-shaped adaptor (a preferred embodiment is a monolithic structure without a joint). The second cylindrical section (18), which is smaller than the vertical cylindrical housing (1) in diameter, houses a snugly fit O-ring (21) or other device that also helps secure the adaptor (100) to the spout-and-valve-fitment on the dispensing container. The O-ring (21) provides the seal between the horizontal cylindrical channel (2) of the L-shaped adaptor (100) and the spout of the valve-and-spout assembly, such that, when the valve is opened as a result of the activator (12) action, the fluid flows out the horizontal cylindrical channel (2) and down for dispensation.

At the bottom, and on the inside of the first end of the horizontal cylindrical channel, that is, inside the joint (20) of the L-shaped adaptor, is provided an optional cylindrical shaped pin also known as seal activator pin (12), which acts as an activator to commence fluid dispensation. The force of action of attachment of the adaptor (100) to the spout-and-valve assembly (8) pushes the pin (12) upwards, into the spout, and activates the spout by opening the seal inside the spout. This activation is in conjunction with the lifting of the two horizontal wings (11) on the spout-and-valve assembly (8), which also aid in activation and fluid flow as the wings (11) are internally mechanically attached to facilitate the opening of the seal. The cylindrical pin (12) located at the bottom of the horizontal cylinder's (2) first end is optionally supported by ridges, that in preferred embodiments are one or more triangular vertical ridges (3) attached to the cylindrical pin. The ridges (30), triangular or otherwise, help against the bending of the cylindrical pin (12) upon exertion of pressure on the pin (12) for activation purposes.

Figure 6:
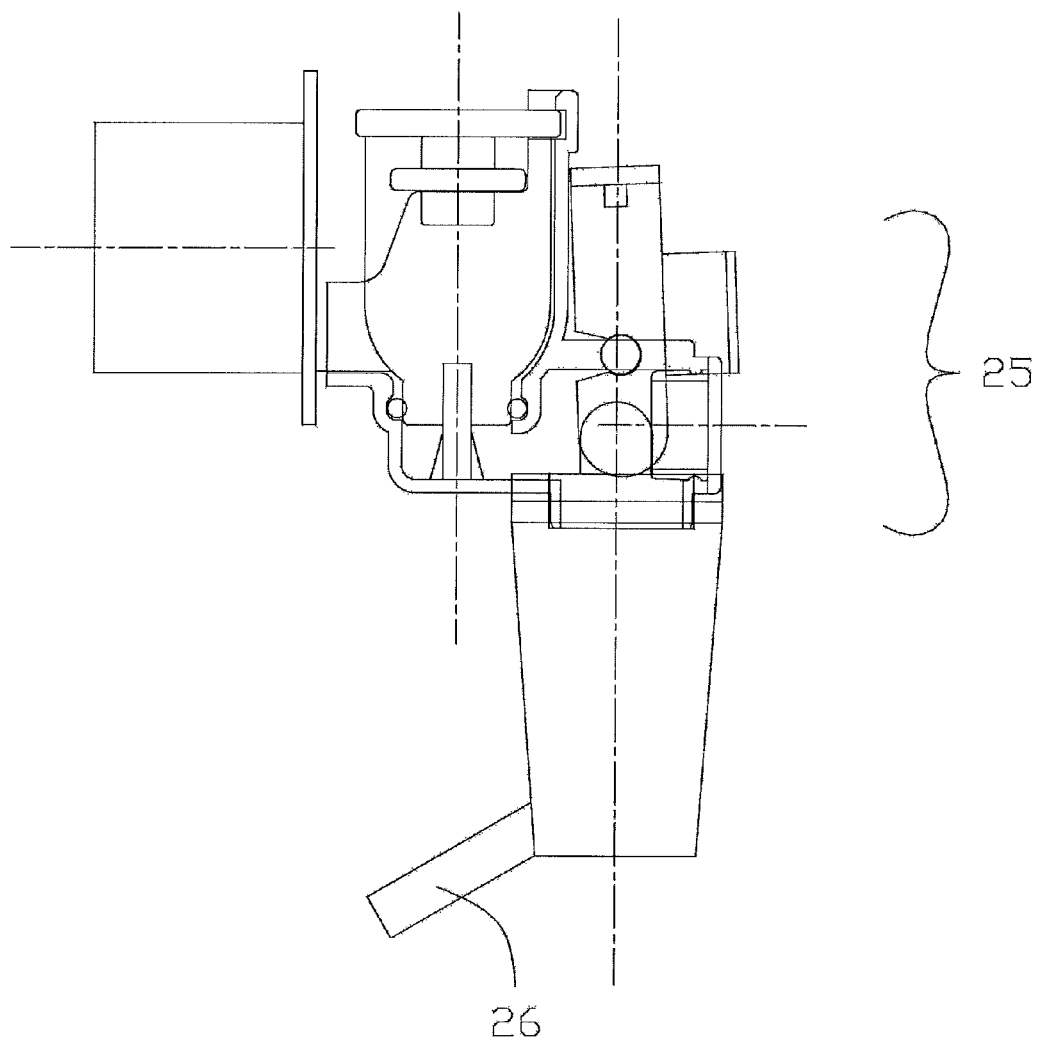
FIG. 6 is a line diagram of the adaptor and dispensing mechanism now connected to the spout-valve setup in an open position such that fluid is dispensed.

The second end of the horizontal cylindrical channel (2) is open. However, it can be closed with a snug fitting cap. The cap can also be threadably or otherwise attached into the opening. On top of the horizontal cylindrical channel (2) are found two locking tabs (22) or lugs oriented transversely to the longitudinal direction of the horizontal cylindrical channel (2). These tabs act as anchors for the locking mechanism (24) used to connect the fitment assembly on to the dispensing setup (23) (see FIGS. 5 and 6) such as a preferably flexible pipe (26) that takes away the dispensed fluid. The locking mechanism is attached to the fitment assembly, which is now connected to the pipe for taking away the fluid. The locking mechanism has angular U-shaped grooves (27) that would connect on similar tabs on the original spout-and-valve assembly on the container, but instead, now connect and lock with the adaptor (100). In other words, the adaptor (100) acts as an in-between sleeve—on its one end, it has adequate design that connects with the spout-and-valve-assembly (8), and on the other end, it has design features that help connect with the dispensing system. The adaptor is generally locked in with the dispensing system, and not the spout and valve fitment assembly. The adaptor-dispensing system assembly is jointly connected with the spout and valve assembly as and when needed. Stated another way, once the dispensation of the fluid is completed, the adaptor is left attached to the dispensing mechanism, and not the spout and valve assembly because once the adaptor (or the adaptor-dispensing mechanism assembly) is attached to the spout valve system, the overall assembly would in an open position with the fluid flowing into the dispensing system.

This invention also relates to a process for dispensing fluid from a fluid container using the parts and their functioning described above.

Abbreviations
1 vertical cylindrical housing
2 horizontal channel
3 first opening in horizontal channel
4 second opening in horizontal channel
5 third opening in horizontal channel
6 cap
7 opening on backside of the vertical housing or cut-away section
8 spout and valve assembly connected to fluid container
9 J-shaped pull tabs
10 partial cylindrical portion that extends above the J-shaped pull tabs
11 horizontal wings
12 seal activator pin
13 vertical cylindrical housing wall proximate to the horizontal leg of the L-shaped adaptor
14 locking groove
15 top ridge of the spout and valve assembly
16 bottom tray
17 vertical walls of the U-shaped bottom tray
18 second cylindrical section
19 vertical cylindrical housing tapered into a second cylindrical section
20 joint of L-shaped
21 O-ring
22 locking tabs
23 dispensing setup
24 locking mechanism
25 locked position (open channel for fluid flow) of the dispensing setup and the adaptor
26 flexible pipe
27 angular U-shaped groove of the locking mechanism
29 partial cylindrical wall
100 L-shaped adaptor

The invention claimed is:
1. An L shaped adaptor used in a fitment valve assemble comprising:
   (I) a vertical cylindrical housing, and
   (II) a horizontal cylindrical channel;
   wherein said vertical cylindrical housing and said horizontal cylindrical channel are connected to each other in an L-shape;
   wherein said vertical cylindrical housing comprises a front wall, and is partially open at the back wall, wherein said opening is the locus for connecting a spout-valve assembly attached to a container that dispenses fluid;
   wherein, said front wall, on the inside, comprises a locking groove for locking said adaptor to said spout-valve assembly;
   wherein, said vertical cylindrical housing comprises two J-shaped pull-tabs attached to the two sides of said front wall, such that said vertical cylindrical housing's side walls protrude over the base of said J-shaped pull-tabs;
   wherein, attached to the opening at the back wall of said vertical cylindrical housing is an U-shaped tray that supports said spout-valve assembly attached to the fluid dispensing container;
   wherein said horizontal cylindrical channel comprises at least a first opening and a second opening;
   wherein said first opening is at the first end proximate to the joint of said L-shaped adaptor, and at the top of said horizontal cylindrical channel such that said first opening opens at the bottom of said vertical cylindrical housing;
   wherein said second opening, used for dispensing fluid into a fluid dispensing setup, is at the opposite end to said first end of said horizontal cylindrical channel;
   wherein at the base of the horizontal cylindrical channel directly below said first opening in said horizontal cylindrical channel is a cylindrical activator pin;
   wherein, said activator pin is supported by at least one ridge, that is triangular;
   wherein at the top of said first opening proximate to the bottom of said vertical cylindrical housing is an O-ring for sealing attachment with said spout-valve assembly;
   wherein said O-ring is situated in a second vertical cylindrical channel that is narrower that said vertical cylindrical housing; wherein on the outside wall of said horizontal cylindrical channel, oriented generally transversely to the longitudinal axis of said second horizontal cylindrical channel and protruding outward, are locking tabs, one on each side of said horizontal cylindrical channel, that are used for locking the locking mechanism of said fluid dispensing setup with said adaptor;
   wherein said horizontal cylindrical channel further comprises a third opening at its second end that is in in a radial plane to the longitudinal axis of said horizontal channel;
   wherein said third opening is closed with a cap.

* * * * *

UNITED STATES PATENT AND TRADEMARK OFFICE
CERTIFICATE OF CORRECTION

| | | |
|---|---|---|
| PATENT NO. | : 8,944,094 B2 | Page 1 of 1 |
| APPLICATION NO. | : 13/804555 | |
| DATED | : February 3, 2015 | |
| INVENTOR(S) | : James W. Johnson | |

It is certified that error appears in the above-identified patent and that said Letters Patent is hereby corrected as shown below:

In the Claims

COL. 6, (Claim 1), line 46, delete the second occurrence of "that" and substitute therefor --than--; line 56, delete the first occurrence of "in"

Signed and Sealed this
Second Day of June, 2015

Michelle K. Lee
*Director of the United States Patent and Trademark Office*